US008270024B2

(12) United States Patent
Brown et al.

(10) Patent No.: US 8,270,024 B2
(45) Date of Patent: Sep. 18, 2012

(54) APPARATUS AND METHOD FOR PRINTING WITHIN A PRINT ZONE ON THE SURFACE OF A SKEWED OBJECT MOVING IN A GIVEN DIRECTION OF TRAVEL

(75) Inventors: Thomas Daniel Brown, Frankfort, KY (US); Mark Chambers, Lexington, KY (US); Robert Warren Rumford, Lexington, KY (US); Michael S. Wilson, Midway, KY (US)

(73) Assignee: Lexmark International, Inc., Lexington, KY (US)

( * ) Notice: Subject to any disclaimer, the term of this patent is extended or adjusted under 35 U.S.C. 154(b) by 349 days.

(21) Appl. No.: 12/729,301

(22) Filed: Mar. 23, 2010

(65) Prior Publication Data

US 2011/0235065 A1 Sep. 29, 2011

(51) Int. Cl.
*G06F 15/00* (2006.01)
*B41J 29/38* (2006.01)

(52) U.S. Cl. .......................................... 358/1.5; 347/16

(58) Field of Classification Search .................... 358/1.5
See application file for complete search history.

(56) References Cited

U.S. PATENT DOCUMENTS 6,464,314 B1 10/2002 Wilson, II
2010/0134552 A1 * 6/2010 Suzuki et al. .................. 347/16

* cited by examiner

*Primary Examiner* — Saeid Ebrahimi Dehkordy
(74) *Attorney, Agent, or Firm* — John Victor Pezdek

(57) ABSTRACT

A printing apparatus for printing within a predefined print zone on a selected surface of a skewed object moving in a given direction of travel includes a bracket, at least two sensors at known positions adjacent to the passing object detecting the leading edge of a given surface, a positioning mechanism mounted on the bracket, a printhead mounted on the positioning mechanism and operable to print on the moving object selected surface, the positioning mechanism operable to position the printhead into a known correct printing position relative to the selected surface, and a controller communicating with the sensors, positioning mechanism, and printhead, and operable to calculate object skew in response to the sensor signals and to operate the positioning mechanism to position the printhead into the known correct printing position and to operate the printhead to print within the predefined print zone on the skewed moving object.

20 Claims, 3 Drawing Sheets

APPARATUS AND METHOD FOR PRINTING WITHIN A PRINT ZONE ON THE SURFACE OF A SKEWED OBJECT MOVING IN A GIVEN DIRECTION OF TRAVEL

CROSS REFERENCES TO RELATED APPLICATIONS

None.

BACKGROUND

1. Field of the Invention

The present invention relates generally to the field of industrial printing devices and, more particularly, to an apparatus and method for printing within a predefined print zone on a selected surface of a skewed object while the object is moving in a given direction of travel.

2. Description of the Related Art

In an industrial environment, it is commonly desired to undertake printing within the bounds of a predefined print zone on a selected surface of an object, such as a carton, envelope, vehicle, toy, etc., as it is moved, such as on a conveyor, past a printhead. For optimum printing it is desired that this predefined print zone be in a predetermined alignment or orientation to the direction of travel of the object. Often times, the selected surface of the object is its top. At other times, the selected surface is a side of the object. Difficulty in accomplishing such printing within the bounds of the predefined print zone, regardless of the selected surface, arises when the orientation or position of the object, and thus the orientation of the predefined print zone, is skewed (or out of alignment) with respect to the direction of travel of the object.

For efficiency and speed, such objects moving on a conveyor are printed with images by printheads attached to apparatuses located adjacent to the conveyor. To print the image correctly, the apparatuses must be able to quickly position the printheads in proper relation to the moving objects. If any of the moving objects are skewed, or not aligned properly relative to the direction of travel, this will complicate the printing of the image within the bounds of the predefined print zone on the top or side surfaces of the objects.

Some printing apparatuses force the objects between guide rails in an attempt to deskew the object prior to printing. However, slight variations in object dimensions or objects of different sizes makes these printing apparatuses problematic. Other devices, such as the one shown in U.S. Pat. No. 6,464,314, utilize a spring-biasing system to keep the printhead apparatus in contact with each object that moves past and to keep the printhead close to the object at a fixed predetermined printing distance. However, printing apparatuses that use contact with the passing object to print images thereon present their own set of problems. They tend to be bulky and complex and can damage the passing objects. Moreover, they do not fully address the problem of printing an aligned image on a skewed object.

Thus, there is a need for an innovation which will overcome the aforementioned drawbacks of these prior art industrial printing apparatuses without introducing any significant new drawbacks in place thereof.

SUMMARY OF THE INVENTION

The present invention meets this need by providing an innovation that resolves the above-mentioned drawbacks through the dynamic positioning of a printhead in a close and deskewed orientation relative to an object moving in a given direction of travel by using sensors to detect the position and skew of the moving object and a controller to operate a printhead position control mechanism in response to the sensor inputs.

Accordingly, in an aspect of the present invention, an apparatus for printing within a predefined print zone on a selected surface of a skewed object, while the object is moving in a given direction of travel, includes a bracket positioned adjacent to the object and the given direction of travel thereof. The apparatus also includes at least two sensors mounted on the bracket in known positions spaced apart from each other and disposed adjacent to the direction of travel of the object. Each of the sensors is operable to generate an electrical signal containing a known change in a property of that signal coincident with detection of a leading edge of a given surface of the object by the sensor. The apparatus also includes a positioning mechanism mounted on the bracket downstream of the sensors relative the direction of travel of the object and adjacent to the object as the object moves past the positioning mechanism. The apparatus further includes a printhead, mounted on the aforementioned positioning mechanism, for undergoing positioning relative to the selected surface of the object. The printhead is operable to print on the selected surface of the object as the object moves past the printhead. The positioning mechanism is operable to position the printhead into a known correct printing orientation relative to the selected surface of the object. The apparatus also includes a controller communicating with each of the sensors, the positioning mechanism, and the printhead. The controller stores a skew calculation algorithm and is operable to receive the signal from each of the sensors and, in response thereto, to initiate the skew calculation algorithm to make a calculation of object skew, and thus of the predefined print zone on the selected surface of the object. The controller then operates the positioning mechanism to position the printhead into the known correct printing orientation. It also operates the printhead to print within the predefined print zone on the selected surface of the object in response to the skew calculation so as to compensate for the skew of the object as the object is moved past the printhead.

In another aspect of the present invention, a method for printing within a predefined print zone on a selected surface of a skewed object, while the object is moving in a given direction of travel, includes detecting a leading edge of a given surface of the object as the object is moved past at least two known positions, spaced apart from each other, disposed above and across the direction of travel of the object. In response to the detection of the leading edge of the given surface of the object at each of the two known positions, the method also includes generating an electrical signal containing a known change in a property of the signal coincident with the detection of the leading edge. In response to generating the signals, the method further includes initiating a skew calculation algorithm to make a calculation of skew of the object, and thus of the predefined print zone on the selected surface of the object. Then, in response to the calculation of object skew, the method includes positioning a printhead in a known relationship to the selected surface of the object and into a known correct printing orientation relative to the selected surface of the object, and then printing within the predefined print zone on the selected surface of the object so as to compensate for the skew of the object as the object is moved past the printhead.

BRIEF DESCRIPTION OF THE DRAWINGS

Figure 1:
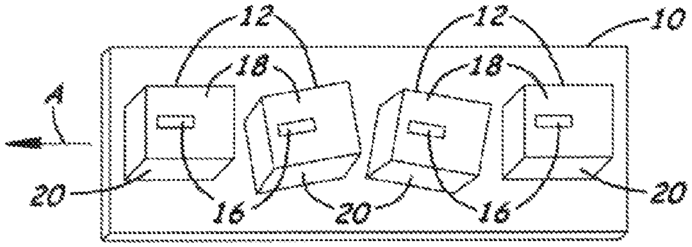

Having thus described the invention in general terms, reference will now be made to the accompanying drawings, which are not necessarily drawn to scale, and wherein:

FIG. 1 is an upper perspective view of a typical conveyor showing skewed moving objects upon which printing occurs according to the present invention.

Figure 2:
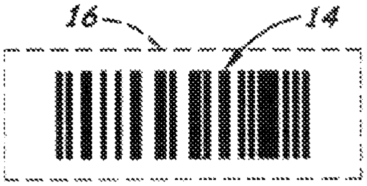

FIG. 2 is a top close-up view of labels to be printed on the moving objects.

Figure 3:
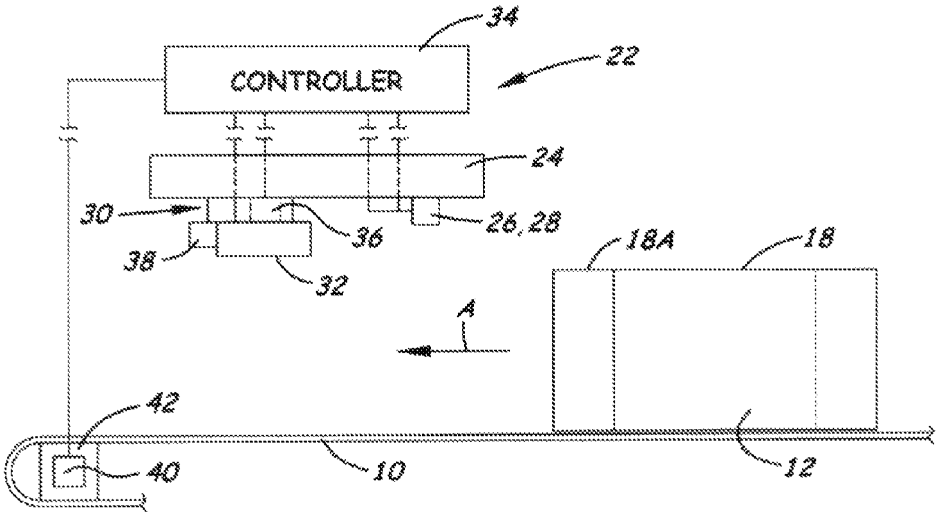

FIG. 3 is a side view of an exemplary embodiment of an apparatus of the present invention disposed to print on the top surface of a skewed object moving in a given direction of travel.

Figure 4:
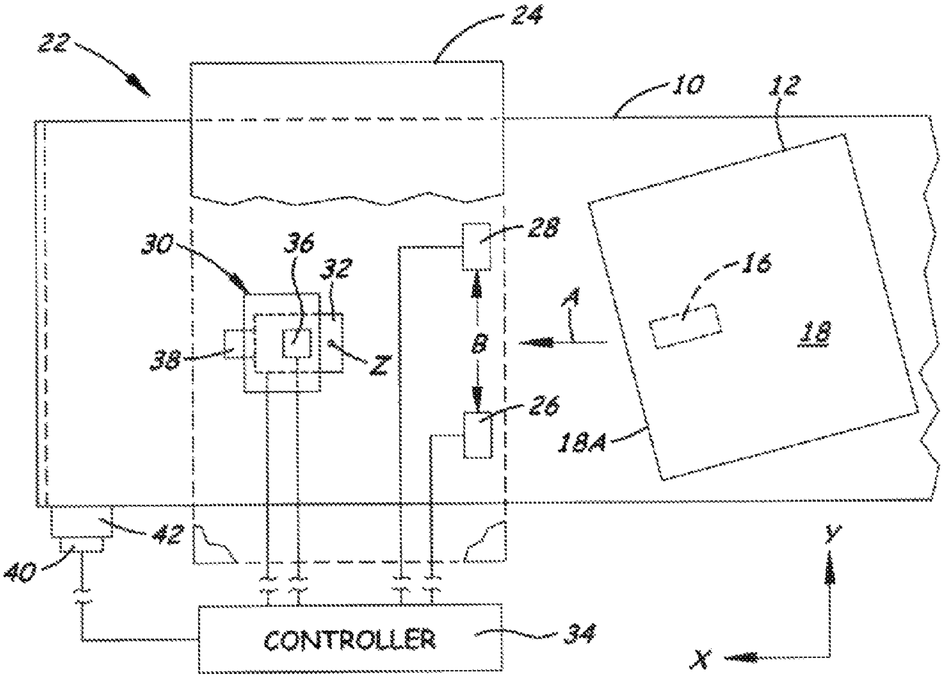

FIG. 4 is a top view of the apparatus of FIG. 3.

Figure 5:
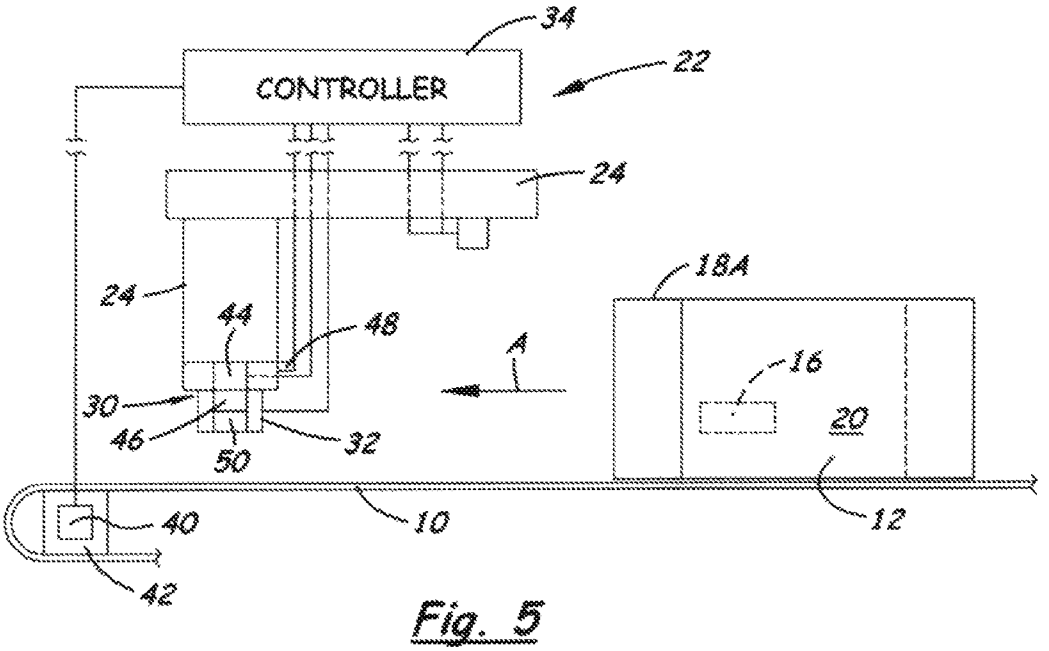

FIG. 5 is a side view of another exemplary embodiment of the apparatus the present invention disposed to print on the side surface of a skewed object moving in the given direction of travel.

Figure 6:
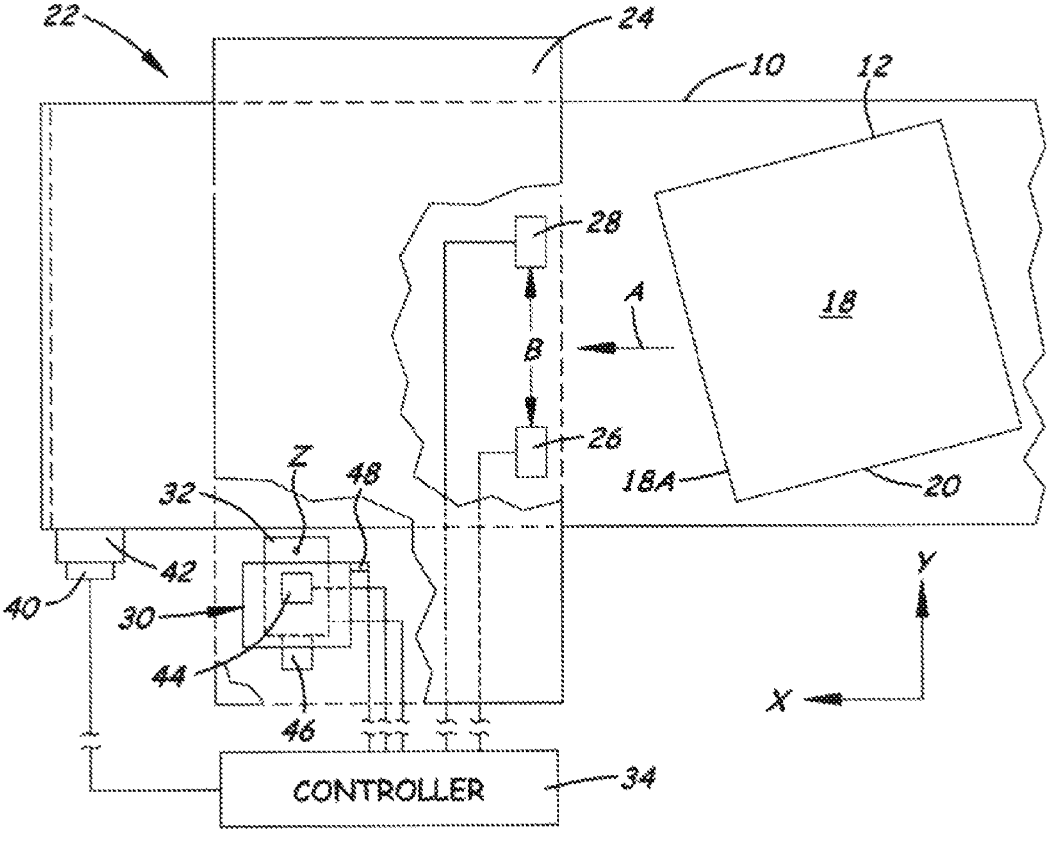

FIG. 6 is a top view of the apparatus of FIG. 5.

Figure 7:
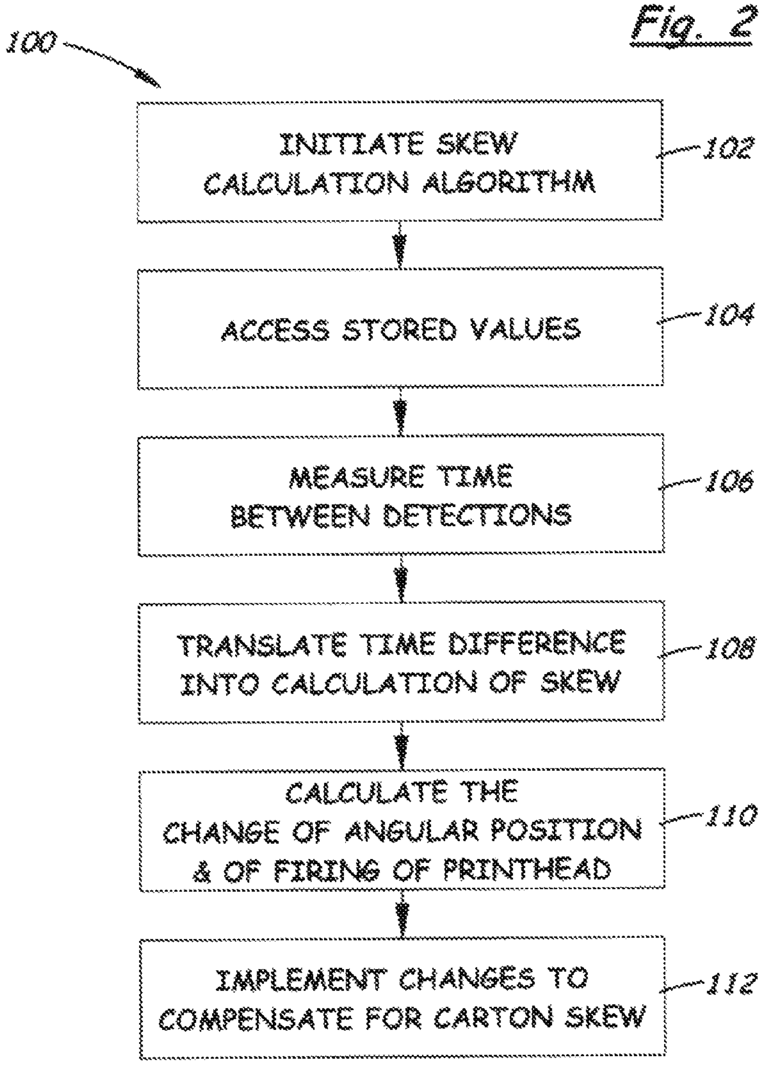

FIG. 7 is a flow diagram depicting steps of a skew calculation algorithm stored by a controller in each of the embodiments of the apparatus.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Referring now to FIG. 1, there is illustrated a mechanism such as a conveyor, generally designated 10, carrying objects 12 that thereby move with the conveyor 10 and that upon which images 14 will be printed in a predefined print zone 16 on the objects 12. As can be seen in FIG. 2, the objects 12 are printed with images 14, such as bar codes, in the predefined print zone 16. Additionally, the skew of the objects 12 traveling with the conveyor 10 relative to their given direction of travel, as represented by an arrow A, is illustrated by the various angled positions of the objects 12 and the predefined print zones 16 relative to the given direction of travel A. Each of the objects 12 in FIG. 1 may be printed with the image 14 on a top surface 18 of the object 12. In one alternative embodiment, as will be seen below, the objects 12 may be printed on a selected one of the side surfaces 20.

Referring now to FIGS. 3-6, two exemplary embodiments of a printing apparatus, generally designated 22, of the present invention, are shown to operate in conjunction with a conveyor 10 moving objects 12 thereon in the direction of travel A. In the first embodiment of FIGS. 3 and 4, printing is to take place within the predefined print zone 16 on the top surface 18 of the object 12. In the second embodiment of FIGS. 5 and 6, printing is to take place within the predefined print zone 16 on the selected one side surface 20 of the object 12. In both embodiments, the printing apparatus 22 includes a bracket 24, at least two sensors 26, 28, a positioning mechanism 30, a printhead 32 and a controller 34. The bracket 24 is stationarily positioned adjacent to the conveyor 10 and the objects 12 thereon for mounting and holding the other components of the printing apparatus 22 in their desired positions relative to the conveyor 10 and objects 12.

In both embodiments, the two sensors 26, 28 are mounted on the bracket 24 in known positions spaced apart from each other through a distance B. In these known positions, the sensors 26, 28 are disposed above and across the direction of travel A of the conveyor 10 and objects 12 thereon and are facing downward toward the top surface 18 of the object as the object 12 is moved under the sensors 26, 28. The sensors 26, 28 may assume the same set of known positions in both embodiments of the printing apparatus 22. In this set of known positions, the sensors 26, 28 are at known elevations, which, for example, may be the same elevation, above the top surface 18 of the object 12. Also in this set of known positions, the sensors 26, 28, spaced apart through the distance B, may be located along a horizontal line, or y-axis, disposed in an orthogonal (or perpendicular) relationship to the horizontal direction of movement A, or x-axis, of the conveyor 10 and object 12. Further, in this set of known positions, the sensors 26, 28 sense or detect a leading edge 18A of the top surface 18 of the object 12 as it passes them on the conveyor 10. In other embodiments, the sensors 26, 28 may be generally positioned adjacent to the direction of travel so as to detect a leading edge of a given surface of an object that is not necessarily the leading edge 18A of the top surface 18. As mentioned above, FIGS. 3 and 4 show the selected surface as the top 18 of the object 12, whereas FIGS. 5 and 6 show the selected surface as the one side 20 of the object 12. Each of the sensors 26, 28 is operable to generate an electrical signal containing a known change in a property of that signal, such as a transition in the signal level, coincident with the detection of the leading edge 18A of the top surface 18 of the object 12 by each sensor 26, 28. The sensors 26, 28 may take any suitable form, such as optical, ultrasonic, sonar, etc.

The positioning mechanism 30 supports the printhead 32 and is mounted on the bracket 32 downstream of the sensors 26, 28 relative to the direction of travel A of the conveyor 10 and objects 12 thereon. The positioning mechanism 30 and printhead 32 thereon are disposed adjacent to the selected surface of the object 12 as the object is moved past them. Thus, when the selected surface is the top 18 of the object 12, the positioning mechanism 30 and printhead 32 thereon are mounted above the conveyor 10 and objects 12, as shown in FIGS. 3 and 4, and when the selected surface is the one side 20 of the object 12, the positioning mechanism 30 and printhead 32 thereon are mounted to the side of the conveyor 10 and objects 12, as shown in FIGS. 5 and 6. The positioning mechanism 30 positions the printhead 32 into a known correct printing orientation relative to the selected surface, 18 or 20, of the object 12. The printhead 32 is operable to print on the selected surface of the object 12 once the printhead 32 is in the known correct printing orientation as the object 12 is moved past the printhead 32.

As illustrated in FIGS. 3-6, the controller 34 is provided in communication with each of the sensors 26, 28, the positioning mechanism 30, and the printhead 32. The controller 34 stores a skew calculation algorithm 100, for example, in firmware, an exemplary embodiment of which being shown in FIG. 7. The controller 34 is operable to receive the electrical signals from each sensor 26, 28 and, in response thereto, to initiate the skew calculation algorithm 100 to make a calculation of the skew of the object 12 and thus of the predefined print zone 16 on the selected top or side surface, 18 or 20, of the object. The controller 34 then operates the positioning mechanism 30 to position the printhead 32 into the known correct printing orientation and operates the printhead 32 to print within the predefined print zone 16 on the selected top or side surface, 18 or 20, of the object 12, in response to the skew calculation so as to compensate for the skew of the object 12 as the object is moved past the printhead 34 on the conveyor 10. The controller 34 may be placed in any convenient location relative to the conveyor 10 so long as it may communicate as required with other components of the printing apparatus 22.

To carry out skew-corrected printing in the predefined print zone 16 on the top surface 18 of the object 12 by the printing apparatus 22 in the first exemplary embodiment thereof as seen in FIGS. 3 and 4, the controller 80 initiates or actuates the stored skew calculation algorithm 100 as per block 102 of FIG. 7 in response to receiving the detection signals from the sensors 26, 28. Values representing the known positions of the sensors 26, 28, the known horizontal distance B between them, and a known velocity of the conveyor 10 and objects 12 are stored by the algorithm, as per block 104. The controller 34 proceeds to determine or measure, as per block 106, the amount of time lapse between the respective two detections as represented, for example, by respective transitions in their electrical signal levels. Then, as per block 108, the controller 34, using the stored parameters or values of the known velocity and relative positions of the sensors 26, 28, translates in accordance with mathematical relationships known to one with skill in the art the time lapse or difference between the signal transitions into a calculation of the skew of the position of the object 12 with respect to its direction of travel A. Next, as per block 110, the controller 34 calculates the change that must be made to the angular position of the printhead 32 about a z-axis and also to the firing of its array of actuator nozzles (not shown) in order to compensate for the skew of the object for correctly carrying out printing on the object. Then, as per block 112, the controller 34 uses the previous calculations for producing an output for manipulating the operation of the positioning mechanism 30 and printhead 32 to print in the correct printing orientation and in the predefined print zone 16 on the top surface 18 of the object 12. To accomplish the angular movement of the printhead 32 into the correct printing orientation, the positioning mechanism 30 may utilize a control motor 36 to angularly position the printhead 32. Once the movement into the correct printing orientation is accomplished, a bias spring 38 may be used to return the printhead 32 back to a normal or home position. Also, alternatively or additionally, the apparatus 24 may employ an encoder device 40 or other detection device, associated with a drive motor 42 for the conveyor 10 or other components of the conveyor 10, to inform the algorithm 100 in the controller 34 of the value of the velocity of the conveyor 10 and objects 12. In general, the known velocity of the conveyor 10 may be assumed, calculated, determined real time or at specified intervals.

To carry out skew-corrected printing in the predefined print zone 16 on the side surface 20 of the object 12 by the printing apparatus 22 in the second exemplary embodiment thereof as seen in FIGS. 5 and 6, the controller 34 initiates or actuates the stored skew calculation algorithm 100 of FIG. 7 to perform the calculation of skew of the object 12 the same as detailed in the description of the first exemplary embodiment above. However, in the second embodiment, the controller 34 also operates the positioning mechanism 30 to move the printhead 32 back and forth as well as angularly. This allows the printhead 32 to both become parallel to the skewed side surface 20 of the object 12 and to move to the proper printing gap distance to the side surface 20 of the object 12. The positioning mechanism 30 may use a control motor 44 to accomplish both the angular movement and back and forth movement. The positioning mechanism 30 may similarly use a bias spring 46 to return the printhead 32 back to a normal or home position. To move the printhead 32 to the proper printing gap distance, the positioning mechanism 30 may include a gap sensor 48 to send a gap signal to the controller 34 corresponding to the distance between the printhead 32 and the side surface 20 of the object 12. The controller 34 may then use the gap distance signal to operate the positioning mechanism 30 to move the printhead 32 back and forth into the known correct printing orientation according to that signal. The back and forth movement may be accomplished by a linear actuator 50 controlled by the controller 34. The bias spring 46 may be used to return the printhead 32 moved by the linear actuator 50 from both the angular position and back and forth position back to the normal or home position.

The foregoing description of several embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:

1. An apparatus for printing within a predefined print zone on a selected surface of a skewed object while the object is moving in a given direction of travel, said apparatus comprising:

a bracket positioned adjacent to the object and the given direction of travel thereof;

at least two sensors mounted on said bracket in known positions spaced apart from each other, disposed adjacent to the direction of travel of the object, and oriented toward a given surface of the object as the object moves past said sensors, each of said sensors operable to generate an electrical signal containing a known change in a property of said signal coincident with detection of a leading edge of the given surface of the object by said sensor;

a positioning mechanism mounted on said bracket downstream of said sensors relative to the direction of travel of the object and adjacent to the selected surface of the object as the object moves past said positioning mechanism;

a printhead mounted on said positioning mechanism for undergoing positioning relative to the selected surface of the object, said printhead being operable to print on the selected surface of the object as the object moves past said printhead, said positioning mechanism being operable to position said printhead into a known correct printing orientation relative to the selected surface of the object; and a controller provided in communication with each of said sensors, said positioning mechanism and said printhead and storing a skew calculation algorithm, said controller being operable to receive said signal from each of said sensors and in response thereto to initiate said skew calculation algorithm to make a calculation of skew of the object and thus of the predefined print zone on the selected surface of the object, and to operate said positioning mechanism to position said printhead into the known correct printing orientation and to operate said printhead to print within the predefined print zone on the selected surface of the object in response to the skew calculation so as to compensate for the skew of the object as the object moved past said printhead.

2. The apparatus of claim 1 wherein said controller in making the calculation of skewness employs a velocity quantity of a conveyor moving the object that is stored by said controller in said skew calculation algorithm.

3. The apparatus of claim 1 wherein said controller in making the calculation of skewness employs a measurement of the velocity of the conveyor moving the object that is made by a detector associated with the conveyor.

4. The apparatus of claim 1 wherein said positioning mechanism and said printhead are disposed above the object where the selected surface of the object to print on is the top surface of the object.

5. The apparatus of claim 4 wherein said printhead is mounted on said positioning mechanism so as to undergo angular movement relative to the top surface of the object in response to said positioning mechanism operating to position said printhead in said known correct printing orientation to the top surface of the object.

6. The apparatus of claim 5 wherein said positioning mechanism includes a control motor operable to angularly move and position said printhead into said known correct printing orientation.

7. The apparatus of claim 6 wherein said positioning mechanism further includes a bias spring operable to return said printhead from an angular position back to a normal position.

8. The apparatus of claim 1 wherein said positioning mechanism and said printhead are disposed adjacent to a side of the object where the selected surface of the object to print on is a side surface of the object.

9. The apparatus of claim 8 wherein said printhead is mounted on said positioning mechanism so as to undergo angular movement relative to the side surface of the object and back and forth movement toward and away from the side surface of the object in response to said positioning mechanism operating to position said printhead in said known correct printing orientation to the side surface of the object.

10. The apparatus of claim 9 wherein said positioning mechanism includes a control motor operable to angularly move and position said printhead into said known correct printing orientation.

11. The apparatus of claim 10 wherein said positioning mechanism further includes a bias spring operable to return said printhead from an angular position back to a normal position.

12. The apparatus of claim 9 wherein said positioning mechanism includes an additional sensor operable to generate a gap signal corresponding to the distance between said printhead and the side surface of the object.

13. The apparatus of claim 12 wherein said controller is operable to receive said gap signal from said additional sensor and in response thereto to operate said positioning mechanism to move said printhead back and forth and position said printhead into the known correct printing orientation.

14. The apparatus of claim 13 wherein said positioning mechanism also includes a linear actuator operable to move said printhead back and forth and position said printhead into said known correct printing orientation.

15. The apparatus of claim 14 wherein said positioning mechanism further includes a bias spring operable to return said printhead from said angular and back and forth positions back to a normal position.

16. A method for printing within a predefined print zone on a selected surface of a skewed object while the object is moving in a given direction of travel, said method comprising:

at least at two known positions spaced apart from each other, disposed adjacent to the direction of travel of the object, and oriented toward a given surface of the object, detecting a leading edge of the given surface of the object as the object moves past the two known positions;

in response to detecting the leading edge of the top surface of the object at each of the two known positions, generating an electrical signal containing a known change in a property of said signal coincident with said detecting;

in response to generating the signals, initiating a skew calculation algorithm to make a calculation of skew of the object and thus of the predefined print zone on the selected surface of the object;

in response to the calculation of skew of the object, positioning a printhead in a known relationship to the selected surface of the object and into a known correct printing orientation relative to the surface of the object; and printing within the predefined print zone on the selected surface of the object in response to the skew calculation so as to compensate for the skew of the object as the object is moved past said printhead.

17. The method of claim 16 wherein said initiating said skew calculation algorithm includes factoring in a velocity quantity of a conveyor moving the object to make said skew calculation.

18. The method of claim 16 wherein said initiating said skew calculation algorithm includes factoring in a measurement of the velocity of a conveyor moving the object to make said skew calculation.

19. The method of claim 16 wherein said positioning includes angularly moving said printhead relative to the object in order to position said printhead into said known correct printing orientation relative to the top surface of the object.

20. The method of claim 16 wherein said positioning includes angularly moving said printhead relative to the object and back and forth moving said printhead toward and away from the object in order to position said printhead into said known correct printing orientation relative to a side surface of the object.

* * * * *